United States Patent [19]
Fenley

[11] 4,067,194
[45] Jan. 10, 1978

[54] CLOSED CIRCUIT POWER SYSTEM

[76] Inventor: Robert C. Fenley, 3358 Cromart, Fort Worth, Tex. 76133

[21] Appl. No.: 739,504

[22] Filed: Nov. 8, 1976

[51] Int. Cl.² .......................................... F15B 21/04
[52] U.S. Cl. ........................................ 60/456; 60/643; 60/650
[58] Field of Search ................. 60/456, 643, 650, 329

[56] References Cited
U.S. PATENT DOCUMENTS 2,166,940  7/1939  Conradson .......................... 60/329
2,813,398  11/1957  Wilcox ................................. 60/456

*Primary Examiner*—Edgar W. Geoghegan
*Attorney, Agent, or Firm*—Arthur F. Zobal

[57] ABSTRACT

A cooling chamber and a heating chamber are employed to obtain a temperature differential for forcing a working gas through a fluid driven work producing device and which then is applied back to the cooling and heating chambers whereby the cycle is repeated. The cooling chamber is cooled with a gas under pressure while the heating chamber is heated with a liquid under pressure.

3 Claims, 3 Drawing Figures

CLOSED CIRCUIT POWER SYSTEM

SUMMARY OF THE INVENTION

It is an object of the present invention to provide a new and simple closed circuit power system with an extended operational life.

The closed circuit power system comprises a sealed cooling chamber with an interior cooling chamber located therein and a sealed heating chamber with an interior heating chamber located therein. A first conduit means extends from the interior cooling chamber to the interior heating chamber. A second conduit means extends from the interior heating chamber to the inlet of a fluid driven work producing means and a third conduit extends from the output of the fluid driven work producing means to the interior cooling chamber. The passageway comprising the conduits and the interior cooling and heating chambers is filled with a working fluid for operating the work producing means. Means is coupled to said first conduit means for forcing the working fluid from said interior cooling chamber to said interior heating chamber for flow through said work producing means back to said interior cooling chamber. A gas under high pressure is provided in said cooling chamber for maintaining the interior thereof and said interior cooling chamber at a low temperature. A liquid under high pressure is provided in said heating chamber for maintaining the interior thereof and said interior heating chamber at a high temperature. In the embodiment disclosed, a variable valve means is coupled to said second conduit means for controlling the volume of working fluid flowing from said interior heating chamber to said work producing means.

DESCRIPTION OF THE PREFERRED EMBODIMENT

Figure 1:
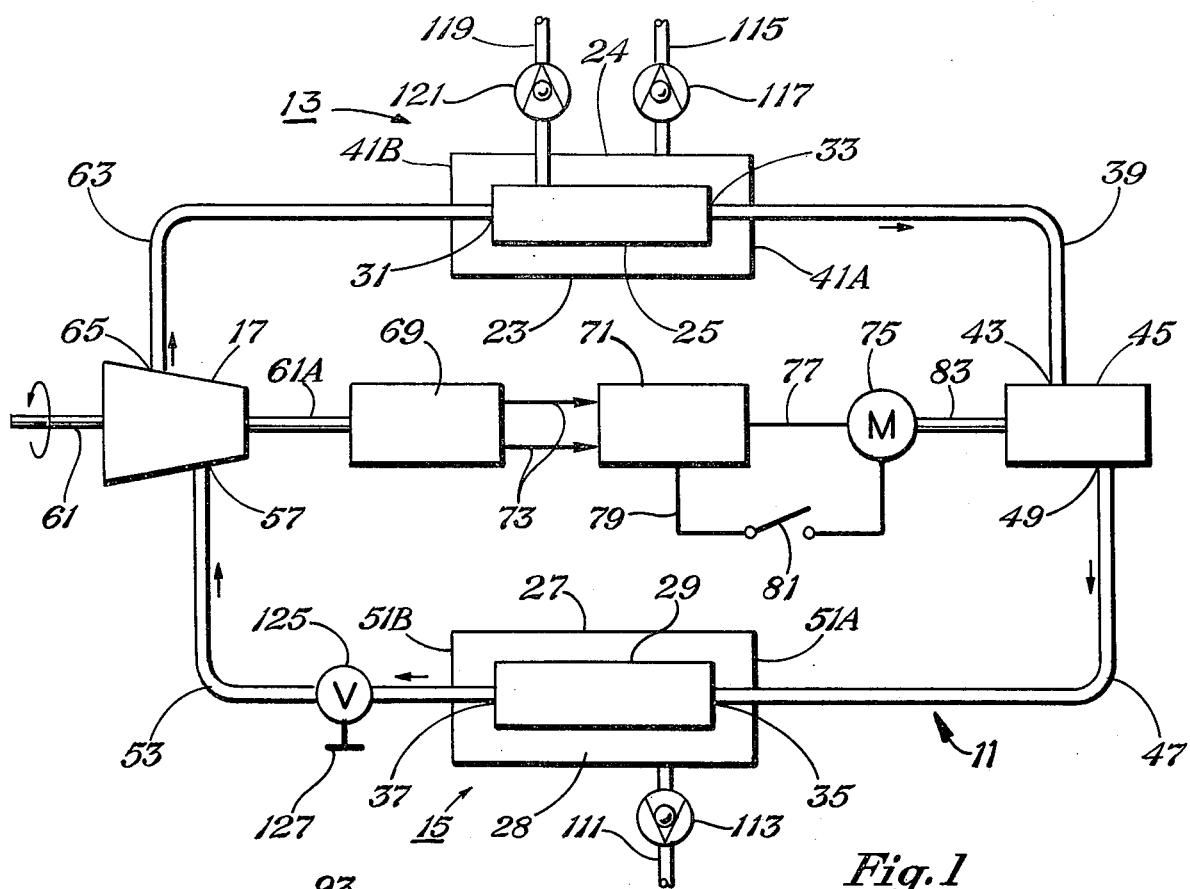
FIG. 1 is a schematic of the closed power system of the present invention.
Figure 2:
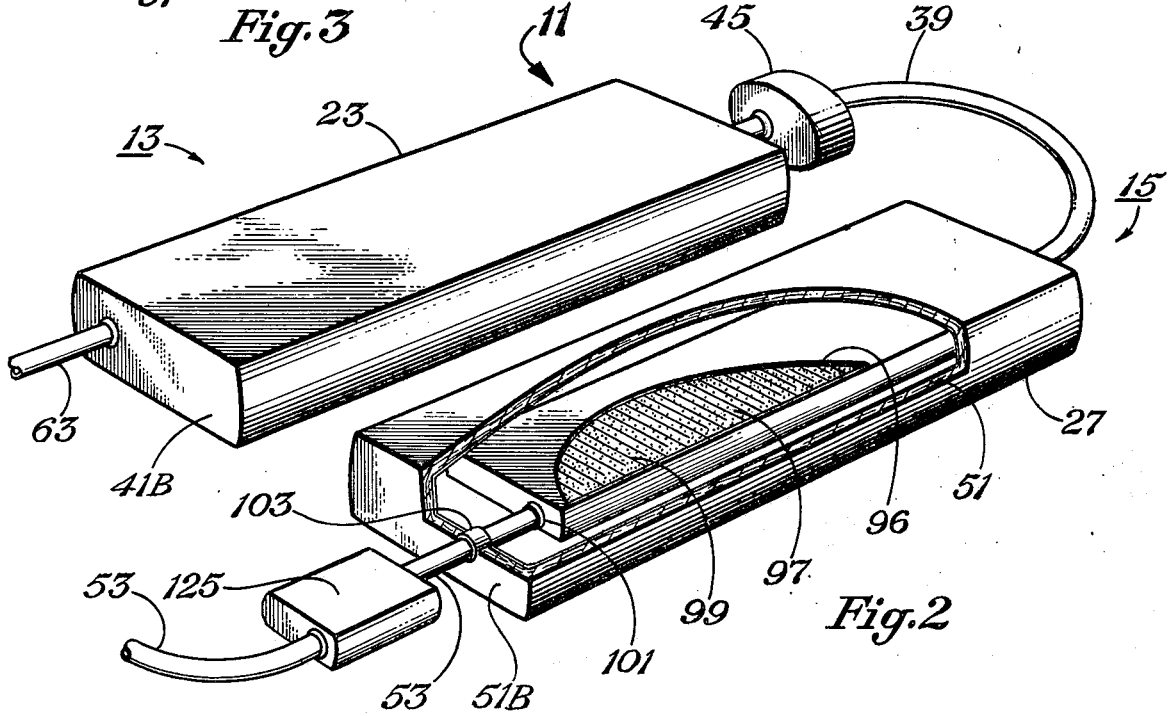
FIG. 2 is a perspective view of a portion of the system of FIG. 1.

Referring now to FIGS. 1 and 2, the closed power circuit system of the present invention is identified at 11 and comprises a quencher bank 13 and a heat bank 15 for forcing a working fluid through a fluid driven work producing device 17. The quencher bank 13 comprises a cooling chamber 23 having located therein an interior cooling chamber 25 and the heat bank 15 comprises a heating chamber 27 having located therein an interior heating chamber 29. Interior chamber 25 has an inlet 31 and an outlet 33. Similarly, the interior cooling chamber 29 has an inlet 35 and an outlet 37. A conduit 39 is coupled to the outlet 33 of the interior chamber 25; extends through the side wall 41A of chamber 23; and is coupled to the inlet 43 of a pump 45 which includes a one-way valve. A conduit 47 is coupled to the outlet 49 of the pump and one-way valve 45; extends through the side wall 51A of the chamber 27; and is coupled to the inlet 35 of the interior chamber 29. A conduit 53 is coupled to the outlet 37 of interior chamber 29; extends through the side wall 51B of chamber 27; and is coupled to the inlet 57 of the fluid driven work producing device 17 which preferably is a conventional gas expansion-reaction turbine engine. The shaft 61 of the turbine 17 may perform useful work i.e. as a direct utilization for transportation or coupled to a generator for producing electricity. A conduit 63 is coupled to the outlet 65 of the device 17; extends through the side wall 41B of the cooling chamber 23 and is coupled to the inlet 31 of the interior chamber 25. The other end 61A of the rotary shaft 61 of the turbine 17 is shown coupled to a small generator 69 for generating electricity for charging a battery 71 by way of leads 73. Although not shown, a suitable system will be employed for preventing the battery from being overcharged. The terminals of the battery are coupled to a DC motor 75 by way of leads 77 and 79 with a switch 81 located in lead 79. The shaft 83 of the motor 75 drives the pump 45.

Chamber 27 is filled with a liquid under high pressure to provide a high temperature to heat the interior chamber 29 while chamber 23 is filled with a gas under high pressure to provide a low temperature to cool the interior chamber 25. The passageway comprising an interior chamber 25, conduits 39 and 47, interior chamber 29, conduit 53, and conduit 63 is filled with a working fluid which preferably is an inert pressurized gas such as helium. The difference in temperature between the quencher bank 13 and heat bank 15 creates a convection current in the gas which forces the gas through the turbine 17 at a high rate of speed and hence rotates the turbines blades and the central shaft 61 for performing work.

Figure 3:
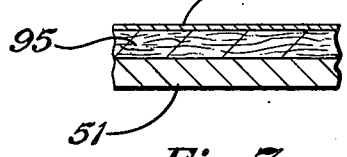
FIG. 3 is a cross-sectional view of a portion of the exterior walls of the heating and cooling chambers of FIGS. 1 and 2.

Referring now to FIGS. 2 and 3, there will be described in more detail the heating chamber 27 and the interior chamber 29. The walls 51 of chamber 27 including the side walls 51A and 51B are formed on a high strength material capable of withstanding both extreme temperatures and pressure. In one embodiment, the walls 51 may be formed of a nickel-chromium or nickel-iron-cobalt alloy. Surrounding the walls 51 is a heat insulating material which comprise alternating layers of reflecting metal foil 93 and silica fibers 95 in a vacuum. The interior chamber 29 in which the actual heat exchange takes place has an outer wall 96 formed of a material which has a good thermal conductivity and can withstand both extreme temperatures and pressure. As one example, the outer well 96 may be formed of molybdenum. Located within the interior chamber 29 is a thermal conductivity filter formed from uniform spherical granules 97 of small enough size to produce a minimal area of porosity, yet maintain adequate permeability for the working gas. The granules 97 may be formed of molybdenum. Barriers 99 are inserted at spaced intervals thus creating a maze between the spherical granules to increase the actual pathway which the working gas must follow. As shown, a sealing member 101 forms a seal between conduit 53 and the walls 96 of the interior chamber 29. In addition, a sealing member 103 forms a seal between the side wall 51B of the chamber 27 and the conduit 53. Similar sealing members are provided to form seals between the conduit 47 and the side wall 51A of chamber 27 and the walls 96 of interior chamber 29.

The structure of chamber 23 is identical to that of chamber 27. In addition, the structure of interior chamber 25 is identical to that of interior chamber 29. Sealing members also are provided for forming seals between conduits 39 and 63 and the walls of chambers 23 and 25 as described with respect to conduits 47 and 53 and the walls of chambers 27 and 29. Thus, as can be understood, chamber 23 is sealed with chamber 25 located therein and chamber 27 is sealed with chamber 29 located therein.

The production of energy in the present system is more dependent upon the temperature spread than the actual degrees. For this reason, a heat source that needs only a portion of the high temperatures usually associated with other common energy sources is required. As indicated above, the heat source is obtained by employing a liquid under pressure in the chamber 27. A synthetic liquid designed for a heat exchange medium may be Monsanto's "Therminol 66" (partially hydrogenated terphenyl) and Dow's "Dowtherm A" (eutectic mixture of diphenyl and diphenyl oxide). These liquids will allow the storage of latent heat that is necessary without boiling and breaking down. They are particularly useful in that they do not freeze or boil from approximately −70° F to 1000° F.

The desired temperature is achieved by first injecting the liquid in the void space 28 between the outer wall of the chamber 27 and the interior chamber 29. Injection may be through conduit 111 and one-way valve 113. After the liquid has been injected, it is pressurized with the use of a hydraulic pump causing increased molecular motion and consequent rise in temperature. By this procedure, the production of heat is created within the heat chamber 27 which can maintain the heat for long periods of time. Temperature fluctuations will be expected and will be induced by the cooler energy transfer gas absorbing the heat energy in the chamber 27 as it passes through the interior chamber 29. When the system returns to an inactive state, the initial temperature will be regained. Should the initial temperature drop considerably, appropriate thermal temperatures can be readily regained by applying additional hydraulic pressure to the liquid in the space 28.

The quencher bank 11 is designed for the purpose of quenching the working gas as indicated above, thereby reducing gas resistance and increasing engine efficiency. In the preferred embodiment, the gas employed in the chamber 23 in the space 24 between the outer walls of the chamber 23 and the interior chamber 25 is carbon dioxide due to its relatively high freezing point and its stability. It is to be understood that other suitable gases may be employed. The carbon dioxide will be injected into the cavity 24 through conduit 115 and one-way valve 117. The gas then will be highly pressurized to achieve a temperature of at least −79.9° C in order to condense the gas into a solid which will remain in that state for a long period of time. Temperature fluxations will be expected during operation of the system, however, when the system returns to an inactive state, the initial temperature will be regained. Should the initial temperature increase considerably, it may be readily regained by applying additional carbon dioxide under pressure in the chamber 23.

As indicated above, the working gas preferably is an inert gas such as helium although other inert gases may be employed. The gas may be injected into the interior chamber 25 by way of conduit 119 and one-way valve 121. The gas will be initially pressurized in the chamber 25 to obtain a large overall heat transfer surface. This in turn enables a much smaller volume of gas to perform a larger work load and to have an increase in engine control through instantaneous heat absorption and dispersion.

Although not shown, it is to be understood that suitable seals will be provided to form seals between conduit 121 and the walls of chamber 23 and 25; between conduit 115 and the wall of chamber 23; and between conduit 111 and the wall of chamber 27.

The purpose of the pump 45 is to provide a continuous flow of the inert gas through the entire energy system. With the use of such a device, an orderly and direct path of inert gas expansion can be obtained over one complete cycle of the system. Being a closed system, the inert gas pathway could begin anywhere, but for analytical purposes and as a reference point, the quencher thermal bank 13 is chosen. From this point, the initially pressurized inner gas contained in the chamber 25 is forced into the chamber 29 of the thermal bank 15 by way of the pump and one-way valve. As it continues through the chamber 29, the gas acquires an amount of energy in excess of its previous equilibrium state induced through thermal agitation from the surrounding chambers temperature and expands. Its tendency to expand, in turn, forces the gas to gain momentum, creating pressure on the turbine's main rotor blades, forcing them to rotate. The rotary motion on the central shaft 61 then performs useful work as indicated above. Once the gas has expanded through the turbine, it begins to encounter natural resistance from the column of gas that preceeds it. To help alleviate this problem, the gas then travels back through the quencher chamber 25 where it loses the majority of its remaining energy through cooling, thereby creating a partial vacuum. The gas then finishes its cycle by being forced again through the pump and one-way valve 45 and re-entering the interior heating chamber 29 where the process is repeated.

A start-up mechanism is provided to place in motion and maintain circulation of the inert gas throughout the entire system. The start-up mechanism comprises the pump and one-way valve 45 and the electrical system comprising the battery 71 which is employed to drive the motor 75. Start-up is initiated by closing the switch 81. Once the energy system is in motion, the battery 71 is recharged through the small generator or alternator 69 driven directly by the turbine 17.

The relatively constant temperatures and gas pressure in the system rules out the conventional methods as means of controlling engine speed. In the present system, engine speed is controlled by a variable pressure valve 125 which is employed to control the volume of expandible gas necessary for a given engine speed. Valve 125 may be a regulator valve. Such a control valve can be operated in either an automatic or manual mode, dependent upon the purpose of the work to be performed. In the embodiment shown, the valve 125 is controlled manually by a control mechanism 127. For maximum energy response, the location of this valve will be in conduit 53 following the heat thermal bank 15 and immediately preceeding the turbine 17.

Of importance in the present system are the relatively permanent thermal sources comprising thermal banks 13 and 15. Under ideal conditions, the actual thermal sources should last at a near constant temperature for long periods of time providing the entire system is adequately insulated and there are no pressure leaks in the system. Should a heat loss occur, the appropriate thermal temperature can be readily regained by applying additional pressure as indicated above.

I claim:
1. A closed circuit power system comprising:
   a sealed cooling chamber;
   an interior cooling chamber, having an inlet and an outlet, located in said sealed cooling chamber, a sealed heating chamber, an interior heating chamber, having an inlet and an outlet, located in said sealed heating chamber, first conduit means coupled to said outlet of said interior cooling chamber and to said inlet of said interior heating chamber for providing a fluid flow path from said interior cooling chamber to said interior heating chamber, said first conduit means extending through the walls of said cooling chamber and through the walls of said heating chamber, a fluid driven work producing means having a fluid inlet and a fluid outlet, second conduit means coupled to said outlet of said interior heating chamber and to said inlet of said work producing means for providing a fluid flow path from said interior heating chamber to said work producing means, said second conduit means extending through the walls of said heating chamber, third conduit means coupled to said outlet of said work producing means and to the inlet of said interior cooling chamber for providing a fluid flow path from said work producing means to said interior cooling chamber, said third conduit means extending through the walls of said cooling chamber, a working fluid in said first, second, and third conduit means and in said interior heating and cooling chambers, a gas under high pressure in said cooling chamber for maintaining the interior thereof and said interior cooling chamber at a low temperature, a liquid under high pressure in said heating chamber for maintaining the interior thereof and said interior heating chamber at a high temperature, and means coupled to said first conduit means for forcing the working fluid from said interior cooling chamber to said interior heating chamber for flow through said work producing means back to said interior cooling chamber.

2. The system of claim 1 wherein:

the walls of said heating chamber in said cooling chamber comprise temperature insulating means, the walls of said interior cooling chamber and said interior heating chamber are formed of a material which has a good thermal conductivity.

3. The system of claim 2 comprising variable valve means coupled to said second conduit means for controlling the volume of working fluid flowing from said interior heating chamber to said work producing means.

* * * * *